April 18, 1950  F. L. ALBEN  2,504,781
REVERSE GEARING

Filed Aug. 30, 1946  2 Sheets-Sheet 1

WITNESSES:

INVENTOR
Frank L. Alben.
BY
ATTORNEY

April 18, 1950   F. L. ALBEN   2,504,781
REVERSE GEARING

Filed Aug. 30, 1946   2 Sheets-Sheet 2

WITNESSES:   INVENTOR
   Frank L. Alben.
   ATTORNEY

Patented Apr. 18, 1950

2,504,781

UNITED STATES PATENT OFFICE 2,504,781

REVERSE GEARING

Frank L. Alben, Pittsburgh, Pa., assignor to Westinghouse Electric Corporation, East Pittsburgh, Pa., a corporation of Pennsylvania Application August 30, 1946, Serial No. 693,971

5 Claims. (Cl. 74—780)

My invention relates, generally, to reverse gearings and, more particularly, to combined reduction and reverse gearings of a type suitable for utilization on turbine driven locomotives and the like.

An object of my invention, generally stated, is to provide a combined reduction and reverse gearing which shall be simple and efficient in operation and which may be economically manufactured and installed.

A more specific object of my invention is to provide a combined reduction and reverse gearing having the same gear ratio for both forward and reverse operation.

Another object of my invention is to provide a combined reduction and reverse gearing which may readily be changed from forward to reverse operation and vice versa.

Other objects of my invention will be explained fully hereinafter or will be apparent to those skilled in the art.

In accordance with one embodiment of my invention, a locomotive may be driven in the forward direction through a reduction gearing or in the reverse direction through a planetary gearing which is so combined with the reduction gearing that the gear ratio is the same for both directions of operation.

For a better understanding of the nature and objects of my invention, reference may be had to the following detailed description, taken in conjunction with the accompanying drawings, in which.

Figure 1:
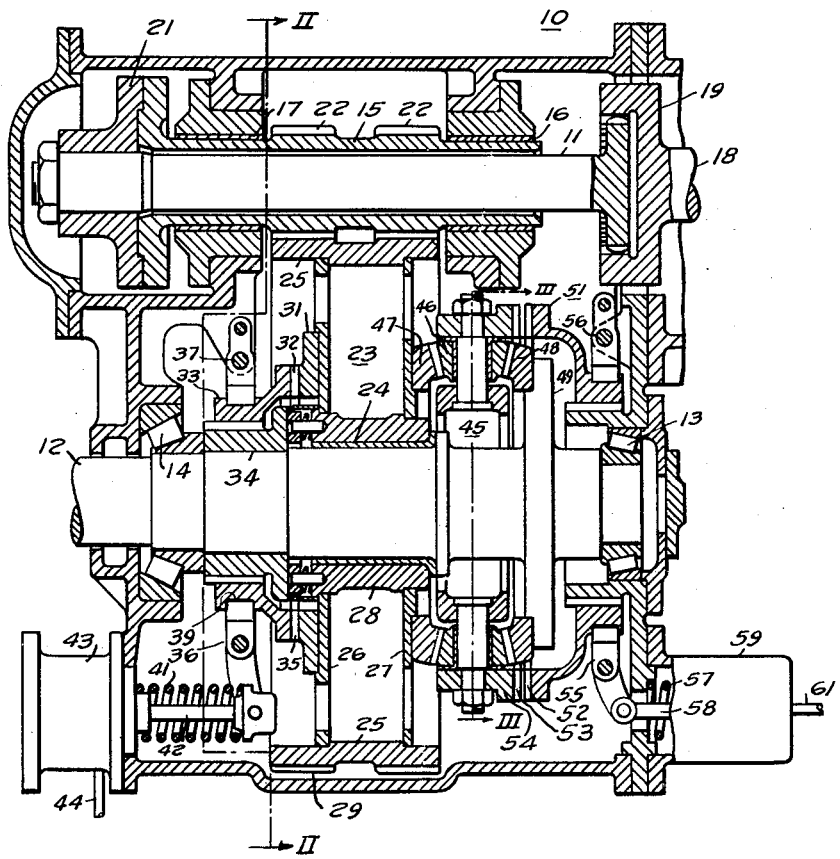
Fig. 1 is a view, in longitudinal section, of a combined reduction and reverse gearing embodying the principal features of my invention.

Referring to the drawings, and particularly to Fig. 1, the structure shown therein comprises a casing 10 with a driving shaft 11 and a driven shaft 12 disposed parallel to the driving shaft 11. The shaft 12 may be mounted in roller bearings 13 and 14 disposed in the casing 10 in spaced relation.

As shown, the shaft 11 may extend through a hollow pinion shaft 15 which is rotatably mounted in sleeve bearings 16 and 17 which are disposed in the casing 10. One end of the shaft 11 may be connected to a turbine or other prime mover shaft 18 through a flexible coupling 19 which may be of the internal-external gear type. The other end of the shaft 11 is connected to one end of the pinion shaft 15 by means of a flanged coupling 21.

The pinion shaft 15 is provided with teeth 22 which mesh with a spur gear 23 rotatably mounted on the shaft 12 by means of a sleeve bearing 24. The gear 23 is preferably of the fabricated type having a gear rim 25 welded to spaced plate members 26 and 27 which are, in turn, welded to a gear hub 28. The gear rim 25 is provided with teeth 29. The teeth 22 and 29 may be of the helical opposed type.

In order to drive the shaft 12 directly through the pinion teeth 22 and the gear 23 for forward operation of the locomotive, a flat gear 31, having teeth 32 on the one side, is secured to the side plate 26 of the gear 23. A clutch member 33 is splined on a sleeve 34 which is secured to the shaft 12. The clutch member 33 is provided with teeth 35 which engage the teeth 32 on the gear 31 when the clutch is in the position shown in the drawing. Thus, torque is transmitted from the shaft 11 through the pinion teeth 22, gear 23 and the clutch 33 to the shaft 12. The shaft 12 rotates at a reduced speed depending upon the number of teeth in the pinion 15 and the gear 23.

Figure 2:
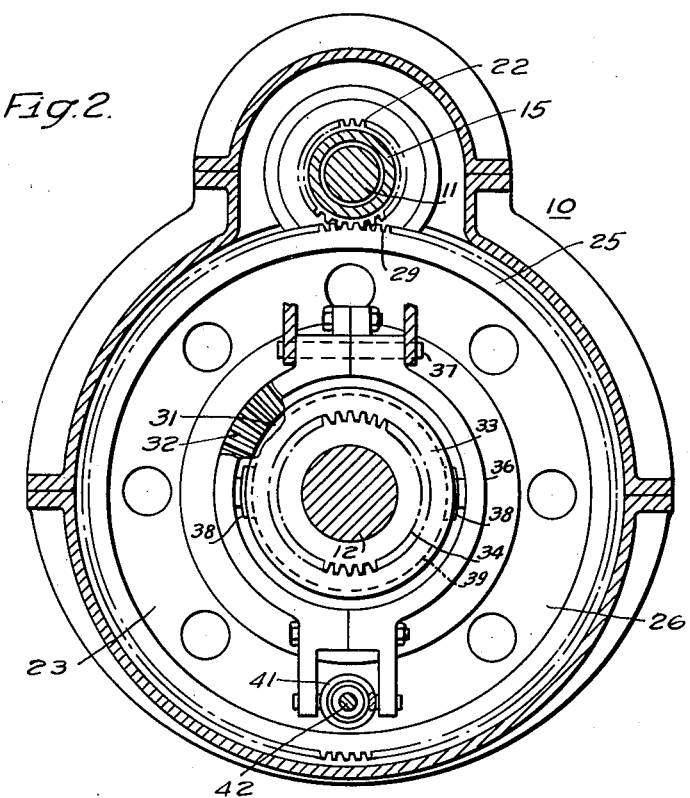
Fig. 2 is a view, in section, taken along the line II—II of Fig. 1.
Figure 3:
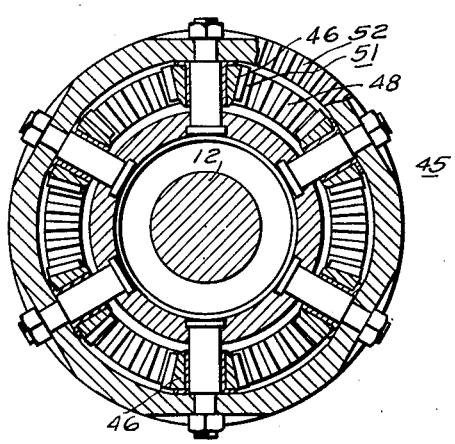
Fig. 3 is a view, in section, taken along the line III—III of Fig. 1.

As shown most clearly in Fig. 2, the clutch member 33 may be actuated into and out of engagement with the gear teeth 32 by means of a yoke 36 which is pivoted in the casing 10 on a pin 37. The yoke 36 is provided with shoes 38 which are disposed in a groove 39 in the clutch member 33.

As shown in Fig. 1, the yoke 36 is biased to the position shown in the drawings by means of a spring 41 which surrounds a piston rod 42. The rod 42 is connected to a piston disposed in a cylinder 43. The construction of the cylinder 43 may be such that the piston compresses the spring 41 to disengage the clutch member 33 when a pressure fluid is admitted to the cylinder 43 through a pipe 44.

In order that the locomotive may be operated in the reverse direction at the same speed as in the forward direction, a planetary carrier 45 is provided. The planetary carrier 45 contains a plurality of planet gears 46 which are of the bevel type, and mesh with a bevel gear 47 secured to the side plate 27 of the gear 23 and a similar bevel gear 48 secured to a flange 49 on the shaft 12.

When it is desired to reverse the locomotive, the clutch member 33 is disengaged and a brake member 51 is engaged. As shown, the brake member 51 is splined in the casing 10 so that it cannot rotate and is provided with teeth 52 which engage teeth 53 provided on a flange 54 on the carrier 45.

Thus, when the brake member 51 engages the carrier 45 to prevent its rotation, the planet gears 46 function as idlers between the bevel gears 47 and 48 to reverse the direction of rotation of the shaft 12. Since the bevel gears 47 and 48 have the same number of teeth, the shaft 12 rotates in the reverse direction at a speed depending upon the number of teeth in the pinion 15 and the gear 23, as is the case for forward operation of the locomotive.

The brake member 51 may be actuated into and out of engagement with the planetary carrier 45 by means of a yoke 55 which is pivoted in the housing 10 on a pin 56 and is constructed similarly to the yoke 36 previously described. The yoke 55 is biased to the position shown in the drawing by a spring 57 which surrounds a piston rod 58 disposed in a cylinder 59. The cylinder 59 may be so constructed that the spring 57 is compressed by a piston inside the cylinder when the pressure fluid is admitted through a pipe 61.

It will be noted that the cylinders 43 and 59 are so constructed that the clutch member 33 is disengaged and the brake member 51 is engaged when pressure fluid is admitted to both cylinders. When the pressure fluid is exhausted from the cylinders, the clutch and brake members are biased to the positions shown in the drawings by means of the springs 41 and 57. The control system for the clutch and brake members may be so interlocked that the members may be actuated only when the locomotive is at a standstill.

From the foregoing description, it is apparent that I have provided a combined reverse and reduction gearing which is relatively simple in structure and is capable of transmitting high amounts of torque. The present gearing provides for reversing the direction of operation of a locomotive or other vehicle and maintaining the same speed for both directions of operation.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. A combined reduction and reverse gearing comprising, a housing, a driving shaft disposed in the housing, a driven shaft disposed in the housing in generally parallel relation to the driving shaft, a pinion secured to the driving shaft, a gear meshing with the pinion and rotatably mounted on the driven shaft, means slidably disposed on the driven shaft for releasably engaging the gear to the driven shaft for one direction of rotation, a bevel gear secured to said gear, another bevel gear secured to the driven shaft, a planet carrier mounted in the housing and rotatable with the driven shaft during said one direction of rotation, planet gears in said carrier meshing with said bevel gears for reversing the direction of rotation of the driven shaft, means slidably disposed in the housing for releasably engaging the carrier to the housing to cause said reversal of rotation through said gears, spring means for biasing said slidably disposed means in one direction, and fluid pressure means for simultaneously actuating said slidably disposed means in the other direction.

2. A combined reduction and reverse gearing comprising, a housing, a driving shaft disposed in the housing, a driven shaft disposed in the housing parallel to the driving shaft, a pinion secured to the driving shaft, a gear meshing with the pinion and rotatably mounted on the driven shaft, means slidably disposed on the driven shaft for releasably engaging the gear to the driven shaft for one direction of rotation, a bevel gear secured to said gear, another bevel gear secured to the driven shaft, a planet carrier mounted in the housing and rotatable with the driven shaft during said one direction of rotation, planet gears in said carrier meshing with said bevel gears for reversing the direction of rotation of the driven shaft, means slidably disposed in the housing for releasably engaging the carrier to the housing to cause said reversal of rotation through said gears, spring means for biasing said slidably disposed means in one direction, and fluid pressure means for actuating the slidably disposed means in the other direction.

3. In a combined reduction and reverse gearing, in combination, a housing, a driving shaft disposed in the housing, a driven shaft disposed in the housing parallel to the driving shaft, a pinion driven by the driving shaft, a spur gear meshing with the pinion and rotatably mounted on the driven shaft, means slidably disposed on the driven shaft for releasably engaging the gear to the driven shaft for one direction of rotation, a bevel gear secured to the spur gear, another bevel gear secured to the driven shaft, a planet carrier mounted in the housing and rotatable with the driven shaft during said one direction of rotation, bevel gears in the carrier meshing with said first and second-named bevel gears for reversing the direction of rotation of the driven shaft, means slidably disposed in the housing for releasably engaging the carrier to the housing to cause said reversal of rotation through said gears, spring means for biasing said slidably disposed means in one direction, and fluid pressure means for actuating the slidably disposed means in the other direction.

4. In a combined reduction and reverse gearing, in combination, a housing, a driving shaft disposed in the housing, a driven shaft disposed in the housing parallel to the driving shaft, a pinion driven by the driving shaft, a spur gear meshing with the pinion and rotatably mounted on the driven shaft, means slidably disposed on the driven shaft for releasably engaging the gear to the driven shaft for one direction of rotation, a bevel gear secured to the spur gear, another bevel gear secured to the driven shaft, a planet carrier rotatable with the driven shaft during said one direction of rotation and having gears meshing with said bevel gears, means slidably disposed in the housing for releasably engaging the carrier to the housing to cause said gears to reverse the direction of rotation of the driven shaft, spring means for biasing said slidably disposed means in one direction, and fluid pressure means for actuating the slidably disposed means in the other direction.

5. In a combined reduction and reverse gearing, in combination, a housing, a driving shaft disposed in the housing, a driven shaft disposed in the housing parallel to the driving shaft, a pinion driven by the driving shaft, a spur gear meshing with the pinion and rotatably mounted on the driven shaft, means slidably disposed on the driven shaft for releasably engaging the gear to the driven shaft for one direction of rotation, a bevel gear secured to the spur gear, another bevel gear secured to the driven shaft, a planet carrier rotatable with the driven shaft during said one direction of rotation and having gears meshing with said bevel gears, means slidably disposed in the housing for releasably engaging the carrier to the housing to cause said gears to reverse the direction of rotation of the driven shaft, said bevel gears being such that the speed of the driven shaft relative to the driving shaft is the same for both directions of rotation, spring means for biasing said slidably disposed means in one direction, and fluid pressure means for actuating the slidably disposed means in the other direction.

FRANK L. ALBEN.

REFERENCES CITED

The following references are of record in the file of this patent:

UNITED STATES PATENTS

| Number | Name | Date |
|---|---|---|
| 919,538 | Chevrolet | Apr. 27, 1909 |
| 926,557 | Frye | June 29, 1909 |
| 2,361,357 | Schmitter | Oct. 24, 1944 |

FOREIGN PATENTS

| Number | Country | Date |
|---|---|---|
| 625,847 | France | Apr. 30, 1927 |